United States Patent [19]

Tan et al.

[11] 4,270,210
[45] May 26, 1981

[54] DIGITAL DIVERSITY RECEIVER, COMPRISING AN APC LOOP FOR LOCKING INSTANTS OF READ-OUT OF BUFFER MEMORIES TO AN AVERAGED PHASE OF SIGNALS SUPPLIED THERETO

[75] Inventors: Yoichi Tan; Seiichi Noda, both of Tokyo, Japan

[73] Assignee: Nippon Electric Co., Ltd., Tokyo, Japan

[21] Appl. No.: 105,172

[22] Filed: Dec. 19, 1979

[30] Foreign Application Priority Data

Dec. 26, 1978 [JP] Japan ............................. 53/162424

[51] Int. Cl.³ ............................................. H04B 7/08
[52] U.S. Cl. ................................. 375/100; 455/132
[58] Field of Search ............... 455/8, 9, 10, 27, 52, 455/57, 101–132; 375/38, 39, 40, 100, 101, 102, 99; 360/5, 47; 364/119; 365/228

[56] References Cited

U.S. PATENT DOCUMENTS

| | | | |
|---|---|---|---|
| 3,555,427 | 2/1968 | Hatton | 375/100 |
| 3,975,687 | 8/1976 | Tan | 375/100 |
| 4,015,205 | 3/1977 | Ikeda | 375/100 |
| 4,035,728 | 7/1977 | Ishikawa | 455/132 |
| 4,143,321 | 3/1979 | Norsworthy | 375/38 |

Primary Examiner—Benedict V. Safourek
Assistant Examiner—Stephen Chin
Attorney, Agent, or Firm—Sughrue, Rothwell, Mion, Zinn and Macpeak

[57] ABSTRACT

A digital signal combining circuit for a diversity receiver for digital communication comprises buffer memories (16) for memorizing digital signal sequences produced by receiver units (11, 12), respectively, and an APC loop (26–39) for locking the phases of read-out clocks for simultaneously reading the memories to an averaged phase of the digital signal sequences. No code error appears in an output signal of the receiver provided that the phase difference between two of the digital signal sequences from which the output signal is selected, is less than m bit periods, where m represents the number of memory cells of each buffer memory.

3 Claims, 6 Drawing Figures

1

DIGITAL DIVERSITY RECEIVER, COMPRISING AN APC LOOP FOR LOCKING INSTANTS OF READ-OUT OF BUFFER MEMORIES TO AN AVERAGED PHASE OF SIGNALS SUPPLIED THERETO

BACKGROUND OF THE INVENTION

This invention relates to a digital signal combining or switching circuit for use in a diversity receiver for digital communication, in which two or more carrier signals modulated by a common digital modulating signal are transmitted from a transmitter and received by the receiver through a plurality of propagation routes, paths, or channels, respectively.

The above-mentioned modulating signal may be a multipliexed signal such as, for example, a multichannel PCM signal. Various techniques for diversity communication, such as space diversity and frequency diversity, are resorted to in order to raise the reliability of radio communication against fading. In space diversity, the modulated carrier signals mentioned above are those transmitted from a plurality of antennas, respectively. Merely for brevity of description, a receiver of the type specified will be called a "digital" diversity receiver herein. Also, the modulated carrier signals will be referred to as "route" signals although this invention is not restricted to a digital signal combining circuit for use only in a receiver for route diversity communication.

In any of the diversity communication techniques, the route signals are demodulated in the receiver into intermediate frequency signals, respectively. Each intermediate frequency signal is further demodulated into a baseband signal. A receiver output signal exempted from adverse effects of fading is produced by combining either the intermediate frequency signals or the baseband signals. In digital communication, the baseband signals, namely, sequences of route digital signals as called herein, are more convenient for this purpose than the intermediate frequency signals. A digitial signal combining circuit therefore produces the receiver output signal by selecting the digital signal sequence derived from one of the route signals that is indicated by a selection signal to be least subjected, of all the route signals, to fading. In other words, the digital signal combining circuit switches, in response to the selection signal, a digital signal sequence derived from a first of the route signals to that derived from a second as soon as the second route signal becomes less subjected to fading than the first.

The route signals reach the receiver with propagation delays, which may be different from each other to give rise to a phase difference between two of the route signals. The propagation delays and hence the phase difference or differences are liable to fluctuate relative to each other as a result of fading. In digital communication, particularly in high-speed digital communication, the phase difference results in instantaneous loss or duplication of one or more bits in the receiver output signal each time when the digital signal sequences are switches from a first to a second. The loss or the duplication gives rise not only to a code error in the receiver output signal but also to collapse of frame synchronism and consequent long-continued code errors.

When the propagation delays are invariable with respect to time so that a phase difference between two route signals is constant, it is readily possible to avoid occurrence of such a code error by merely supplying one of the digital signal sequences derived from the two route signals to the digital signal combining circuit through a delay circuit. The technique of avoiding the code error is, however, not so simple when relative fluctuation may occur in the propagation delays of the two route signals or in the phase difference therebetween.

A baseband signal switching arrangement for diversity reception in a PCM radio communication signal is revealed in U.S. Pat. No. 4,015,205 issued to Kiyoshi Ikeda and Toshihiko Mitani, assignors to the present assignee. As will later be described more in detail with reference to one of several figures of the accompanying drawings, the arrangement comprises a plurality of buffer memories for temporarily memorizing the respective route digital signal sequence. Each buffer memory comprises, in turn, a predetermined number of memory cells. The receiver output signal is produced by reading one of the buffer memories that is indicated by the selection signal. A read-out signal for reading the selected buffer memory is synchronized with the route digital signal sequence memorized therein. The phase of the read-out signal therefore discontinuously varies when the selection signal selects another of the buffer memories that is for memorizing a digital signal sequence of a different phase. The arrangement is effective in eliminating the code error resulting from the relative fluctuation of the propagation delays. It is, however, impossible with this arrangement to eliminate the code error when the relative fluctuation in phase between two route signals from which the digital signal sequences to be switched from one to the other are derived, becomes at least equal to a half of the predetermined number in terms of clock period of the digital signal sequences. In other words, the disclosed arrangement needs buffer memories of a considerably large memory capacity.

SUMMARY OF THE INVENTION

It is therefore a general object of the present invention to provide a digital signal combining circuit for use in a digital diversity receiver, which circuit is capable of switching digital signal sequences derived from two or more route signals received by the receiver from one to another without any objectionable code error in an output signal of the receiver.

It is a specific object of this invention to provide a digital signal combining circuit of the type described, in which buffer memories need not have a large memory capacity.

It is another specific object of this invention to provide a digital signal combining circuit of the type described, with which it is possible to avoid occurrence of a code error in the receiver output signal provided that relative fluctuation of phases of two of the route signals from which digital signal sequences to be switched from one to the other are derived, is less than the number of memory cells of each buffer memory in terms of clock period of the digital signal sequences.

A digital signal combining circuit to which this invention is applicable is for use in a digital diversity receiver for deriving a receiver output signal from a plurality of route signals received thereby. The diversity receiver comprises a plurality of receiver units for receiving the respective route signals and a selection signal producing circuit connected to the receiver units for producing a selection signal indicative of one of the route signals that is least subjected, of the route signals, to fading. Each receiver unit derives a clock pulse sequence of a reference clock period, a sequence of route digital signals variable at the reference clock period in compliance with the route signal received by that receiver unit, and a frame synchronizing signal sequence of a frame period equal to an even integral multiple of the reference clock period from the last-mentioned route signal to produce these three sequences. The combining circuit is for connection to the receiver units and the selection signal producing circuit and includes a plurality of buffer memories, a plurality of write-in clock generators, write-in means, a plurality of read-out circuits, a voltage controlled oscillator, and a read-out clock generator.

The buffer memories are connected to the respective receiver units. Each buffer memory comprises a predetermined number of memory cells. The predetermined number is equal to an even integral submultiple of the integral multiple.

The write-in clock generators are connected to the respective receiver units. Each clock generator is for generating a set of write-in clock pulse trains of a write-in clock period equal to the reference clock period multiplied by the predetermined number and synchronized with the frame synchronising signal sequence produced by the receiver unit connected to that clock generator and of write-in clock phases staggered relative to each other to define a series of write-in instants, equal in number to the predetermined number, in every write-in clock period.

The write-in means is connected to each write-in clock generator, the receiver unit connected to that write-in clock generator, and the memory cells of the buffer memory connected to the last-mentioned receiver unit. The write-in means is for writing the digital signals of the digital signal sequence produced by the last-mentioned receiver unit cyclically in the last-mentioned memory cells at the respective write-in instants defined by the write-in clock pulse trains generated by that write-in clock generator. The last-mentioned memory cells thereby produce a plurality of those memorized digital signal trains, respectively, which comprise memorized digital signals variable at the write-in clock period and into which the last-mentioned digital signal sequence is divided with the route digital signals thereof converted to the memorized digital signals, respectively.

The read-out circuits are connected to the respective buffer memories. Each read-out circuit comprises a plurality of read-out units for receiving the memorized digital signal trains from the respective memory cells of the buffer memory connected to that read-out circuit.

The voltage controlled oscillator is for generating a local clock pulse train of a local clock period substantially equal to the reference clock period and of a controllable local clock period.

The read-out clock generator is connected to the voltage controlled oscillator. The read-out clock generator is for frequency dividing the local clock pulse train by the predetermined number to generate a set of read-out clock pulse trains of a read-out clock period and of read-out clock phases staggered relative to each other to define a series of read-out instants, equal in number to the predetermined number, in every read-out clock period.

The digital signal combining circuit according to this invention is characterized by phase difference averaging means, control means, read-out means, and selecting means.

The phase difference averaging means is connected to predetermined ones of the receiver units and the write-in clock generators. The phase difference averaging means is for averaging the phase differences of the write-in clock pulse train sets generated by the respective write-in clock generators relative to the local clock phase to produce a result signal representative of an average of the phase differences.

The control means is connected to the phase difference averaging means and the voltage controlled oscillator. The control means is for controlling the local clock phase in response to the result signal.

The read-out means is connected to each read-out circuit and the read-out clock generator. The read-out means is for reading a train of read-out digital signals cyclically from the read-out units of that read-out circuit. The read-out digital signals are those portions of the memorized digital signals received by the last-mentioned read-out units, respectively, which are specified by the read-out instants.

The selecting means is connected to the selection signal producing circuit, the voltage controlled oscillator, and the read-out means connected to the respective read-out circuits. The selecting means is for deriving the receiver output signal by selecting with reference to the selection signal and the local clock pulse train one of the read-out digital signal trains read out of the respective read-out circuits.

BRIEF DESCRIPTION OF THE DRAWINGS

FIG. 6 shows the signals illustrated in FIG. 4 for the case for which FIG. 5 is depicted.

DESCRIPTION OF THE PREFERRED EMBODIMENTS

Figure 1:
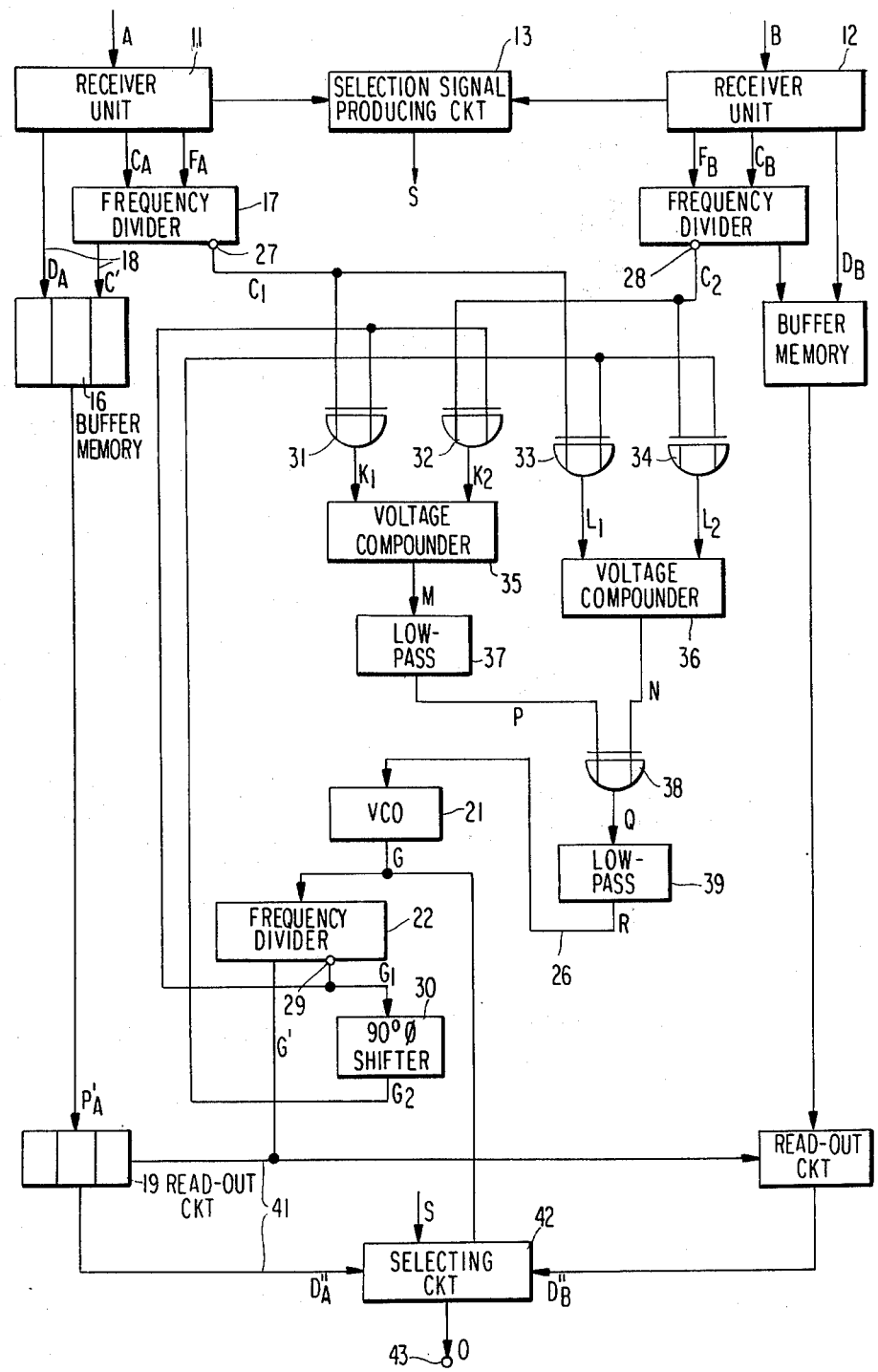
FIG. 1 is a block digram of a diversity receiver including a digital signal combining circuit according to an embodiment of the instant invention.

Referring to FIG. 1, a digital signal combining circuit according to an embodiment of the present invention is for use in a digital diversity receiver for deriving a receiver output signal O from two or more route signals, such as first and second route signals A and B, received thereby. The diversity receiver comprises first and second receiver units 11 and 12 for receiving the first and the second route signals A and B, respectively, and a selection signal producing circuit 13 connected to all the receiver units 11 and so forth for producing a selection signal S indicative of one of the route signals that is least subjected, of all the route signals, to fading. Only parts accompanying the first receiver unit 11, namely, only parts of a first of a plurality of channels for the respective route signals, will mainly be described in the following, together with those parts, such as the selection signal producing circuit 13, which are common to the receiver units or the channels. This is because the respective receiver units are accompanied by similar parts that are operable in like manners.

As described in U.S. Pat. No. 4,015,205 referred to hereinabove, the first receiver unit 11 derives a clock pulse sequence C (designated by $C_A$ in FIG. 1) of a reference clock period, a sequence D (indicated by $D_A$ in FIG. 1) of route digital signals or data variable at the reference clock period in compliance with the first route signal A, and a frame synchronizing signal sequence F (represented by $F_A$ in FIG. 1) of a frame period equal to a preselected number of the reference clock periods from the route signal A to produce the three sequences C, D, and F. The selection signal producing circuit 13 may be an error pulse comparison circuit described in the above-referenced patent. A digital signal combining circuit according to this invention is applicable to route signals for which the preselected number is equal to an even integer.

Further referring to FIG. 1, a digital signal switching arrangement disclosed in the above-cited patent will be described for a short while. This is because the switching arrangement comprises similar parts and because such description will facilitate an understanding of the present invention. The switching arrangement is for connection to the receiver units 11 and so on and to the selection signal producing circuit 13. The first receiver unit 11 is accomplished by and connected to a first buffer memory 16 of the switching arrangement. The buffer memory 16 comprises a predetermined number of memory cells symbolized by three neighboring rectangles depicted in the rectangular box 16. The predetermined number is preferably equal to three or more. According to this invention, the predetermined number should be an even integral submultiple or fraction of the even integer.

The switching arrangement comprises a first write-in clock generator 17 connected to the first receiver unit 11 to be supplied with the clock pulse sequence C and the frame synchronizing signal sequence F. The clock generator 17 is for frequency dividing the clock pulse sequence C by the predetermined number in synchronism with the frame synchronizing signal sequence F to generate a set of write-in clock pulse trains or sequences C'. The write-in clock pulse trains C' have a common write-in clock period and write-in clock phases. Because of the frequency division, the write-in clock period is equal to the reference clock period multiplied by the predetermined number and consequently to an even integral submultiple of the frame period. The write-in clock phases are staggered relative to each other to define a series of write-in instants, equal in number to the predetermined number, in every write-in clock period. As will become clear as the description proceeds, it is unnecessary that the number of write-in clock pulse trains of each set be equal to the predetermined number. Consequently, the number of write-in clock pulse trains generated by one of the clock generators need not be always equal to that of the write-in clock pulse trains generated by another.

A part of write-in connections 18 is extended from the first receiver unit 11 to the memory cells of the first buffer memory 16. A remaining part of the connections 18 is extended from the first write-in clock generator 17 to the last-mentioned memory cells. Through the connections 18, the digital signals of the sequence D produced by the receiver unit 11 are cyclically written in the memory cells of the buffer memory 16 at the respective write-in instants defined by the write-in clock pulse trains C' generated by the write-in clock generator 17. The memory cells now produce a group of those memorized digital signal trains D' (designated by $D'_A$ in FIG. 1), respectively, which comprise memorized digital signals variable at the write-in clock period. The digital signal sequence D is thus divided into the memorized digital signal trains D' with the route digital signals of the sequence D converted to the respective memorized digital signals.

The switching arrangement further comprises a first read-out circuit 19 connected to the first buffer memory 16. The read-out circuit 19 comprises a plurality of read-out units for receiving the memorized digital signal trains D' from the respective memory cells of the buffer memory 16.

The read-out circuit 19 as named herein corresponds, in the description of the above-referenced patent, to a set of NAND gates with input terminals thereof connected to flip-flops that serve as the respective memory cells of each buffer memory. The read-out circuit, such as 19, is so called herein merely for convenience.

The switching arrangement still further comprises parts common to all the receiver units, such as 11 and 12, or all the channels. A voltage controlled oscillator (VCO) 21 is one of the common parts and is for generating a local clock pulse train G of a local clock period substantially equal to the reference clock period and of a local clock phase controllable as will presently be described. A read-out clock generator 22 is another of the common parts and is connected to the voltage controlled oscillator 21. The read-out clock generator 22 is for frequency dividing the local clock pulse train G by the predetermined number to generate a set of read-out clock pulse trains G'. It is unnecessary that the number of read-out clock pulse trains G' be either equal to the predetermined number or to the number of write-in clock pulse trains of any one of the sets, such as C'. The read-out clock pulse trains G' have a common read-out clock period and read-out clock phases. As will readily be understood, the read-out clock period is substantially equal to the write-in clock period. The read-out clock phases are staggered relative to each other to define a series of read-out instants, equal in number to the predetermined number, in every read-out clock period.

An output circuit that will become clear as the description proceeds is still another of the common parts and is connected to the write-in clock generators 17 and so forth, the selection signal producing circuit 13, the read-out circuits 19 and so on, the voltage controlled oscillator 21, and the read-out clock generator 22. The output circuit is for deriving, in response to the selection signal S and the local clock pulse train G, the receiver output signal O from the memorized digital signal train groups, such as D', received by the read-out units of the respective read-out circuits 19 and so on.

In the description of the above-cited patent, the output circuit comprises a channel selecting flip-flop responsive to the selection signal S and the local clock pulse train G for producing a channel selecting signal that specifies one of the channels of the switching arrangement that receives the digital signal sequence, such as D, derived from the route signal indicated by the selection signal S. The output circuit further comprises a phase comparator or discriminator device responsive to the channel selecting signal for selecting only one of the write-in clock pulse train sets, such as C', at a time that is used in the specified channel and for comparing the phases of the selected write-in clock pulse train set with the read-out clock phases to produce a result signal for controlling the local clock phase. The channel selecting signal enables one of the read-out circuits 19 and so forth at a time to make the enabled read-out circuit produce a plurality of read-out digital signal series. The output circuit still further comprises a single NAND gate for shaping the read-out digital signal series into a single read-out digital signal train and a timing flip-flop responsive to the local clock pulse train G for deriving the receiver output signal O from the single read-out digital signal train.

The digital signal switching arrangement of the referenced patent thus eliminates code errors even if those two of the route signals from which the receiver output signal O should selectively be derived, are subjected to relative fluctuation of the propagation delays. The function, however, fails when the relative fluctuation exceeds the reference clock period multiplied by a half of the predetermined number as pointed out hereinabove.

Referring more particularly to FIG. 1, the output circuit of a digital signal combining circuit according to the embodiment of this invention being illustrated, comprises a phase difference averaging circuit connected to the write-in clock generators 17 and so on and the read-out clock generator 22. As described hereinabove, the output circuit is for switching between two of the route digital signal sequences, such as D, as soon as the route signal from which one of the two route digital signal sequences is derived, becomes less subjected to facing than the other. The phases of the two route signals or the two frame synchronizing signal sequences thereof may fluctuate relative to each other. The phase difference averaging circuit is primarily for averaging the phases to produce a result signal R representative of an average of the phases. Inasmuch as the result signal R is for use in controlling the local clock phase through a control connection 26 extended from the phase difference averaging circuit to the voltage controlled oscillator 21, the result signal R is made to represent either an average of the phase differences of the two route digital signal sequences or frame synchronizing signal sequences relative to the read-out clock pulse trains G' or an average of the phase differences of the clock pulse sequences, such as C, relative to the local clock pulse train G.

The phase difference averaging circuit comprises an output terminal 27 of the first write-in clock generator 17 for producing a first clock synchronizing pulse train $C_1$ of a clock synchronizing period equal to twice the write-in clock period and of a clock synchronizing phase synchronized with the frame synchronizing signal sequence F produced by the first receiver unit 11. A similar terminal 28 of a second write-in clock generator connected to the second receiver unit 12 is for producing a second clock synchronizing pulse train $C_2$ of the clock synchronizing period and of another synchronizing phase synchronized with another frame synchronizing signal sequence $F_B$ produced by the second receiver unit 12. A like terminal 29 of the read-out clock generator 22 is for producing a zero-phase pulse train $G_1$ of a period that is equal to twice the read-out clock period and of a zero phase dependent on the local clock phase. The period of the zero-phase pulse train $G_1$ is substantially equal to the clock synchronizing period. A 90° phase shifter 30 is for shifting the phase of the zero-phase pulse train $G_1$ by 90° or $\pi/2$ to produce a 90°-phase pulse train $G_2$.

The phase difference averaging circuit further comprises a first set of phase comparators, such as 31 and 32, and a second set of phase comparators, such as 33 and 34, each of which may be an Exclusive OR circuit. Responsive to the first clock synchronizing pulse train $G_1$ and the zero-phase pulse train $G_1$, a first of the first-set phase comparators 31 produces a first phase difference signal of a first set $K_1$, which signal has a level variable with the phase difference between the first clock synchronizing phase and the zero phase. A second of the first-set phase comparators 32 likewise produces a second of the first-set phase difference signals $K_2$ of a level variable with the phase difference between the second clock synchronizing pulse train $C_2$ and the zero-phase pulse train $G_1$. Similarly, a first of the second-set phase comparators 33 produces a first phase difference signal of a second set $L_1$, which has a level variable with the phase difference between the first clock synchronizing pulse train $C_1$ and the 90°-phase pulse train $G_2$. A second of the second-set phase comparators 34 produces a second of the second-set phase difference signals $L_2$ of a level variable with the phase difference between the second clock synchronizing pulse train $C_2$ and the 90°-phase pulse train $G_2$.

In FIG. 1, the first-set phase difference signals, such as $K_1$ and $K_2$, are supplied to a first voltage compounder 35 for producing a first sum signal M of a level equal to a sum of the first-set phase difference signal levels. A second voltage compounder 36 produces a second sum signal N of a level equal to a sum of the levels of the second-set phase difference signals, such as $L_1$ and $L_2$. A first low-pass filter 37 is for rejecting higher frequency components of the first sum signal M to produce a switching signal P, responsive to which a switching circuit 38 switches the second sum signal N to produce a switch output signal Q. The switching circuit 38 may be an Exclusive OR circuit. A second low-pass filter 39 rejects higher frequency components of the switch output signal Q and produces the result signal R. The phase difference averaging circuit and the control connection 26 thus serve as an automatic phase control (APC) loop for the voltage controlled oscillator 21.

The output circuit of the digital signal combining circuit depicted in FIG. 1 further comprises read-out connections, such as 41. A portion of the read-out connections 41 is connected to the first read-out circuit 19 and the read-out clock generator 22 for reading a first train $D''_A$ of read-out digital signals cyclically from the read-out units of the read-out circuit 19. The read-out digital signals for the first train D'' (suffix omitted), for example, are those portions of the memorized digital signals received by the first read-out circuit 19, which are specified by the read-out instants defined by the read-out clock pulse train set G' common to the read-out circuits 19 and so forth. A selecting circuit 42 of the output circuit is connected to the selection signal producing circuit 13, the voltage controlled oscillator 21, and remaining portions of the read-out connections, such as 41, connected to the respective read-out circuits 19 and so on. With reference to the selection signal S and the local clock pulse train G, the selection circuit 42 derives the receiver output signal O by selecting one of the read-out digital signal trains, such as the first read-out digital signal train $D''_A$, read out of the respective read-out circuits 19 and so on. The receiver output signal O is supplied to an output terminal 43 of the receiver in synchronism with the local clock pulse train G.

Referring to FIGS. 2 through 6, operation of a digital signal combining circuit according to a specific embodiment of this invention will be described. Merely for simplicity of description, it is assumed that the digital signal combining circuit is for only first and second digital signal sequences A and B and that three is selected as the predetermined number.

Figure 2:
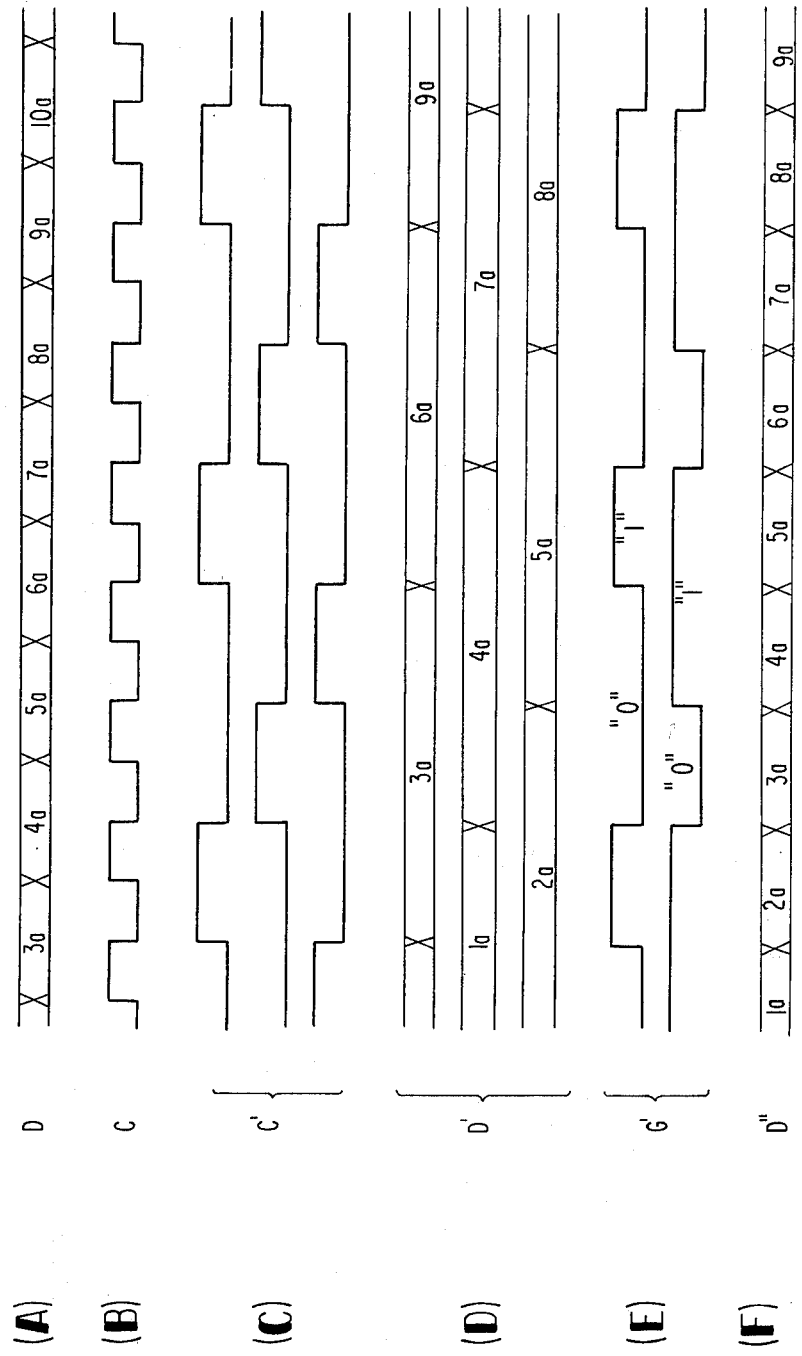
FIG. 2 is a time chart illustrating several signals that appear in a digital signal combining circuit according to a specific embodiment of this invention.

In FIG. 2, let the first digital signal sequence D depicted along the top line (A) comprise route digital signals 0a, 1a, and 2a (not shown along the top line) and 3a, 4a, . . . , and 10a that are variable at the reference clock period of the clock pulse sequence C produced by the first receiver unit 11 and shown along a next following line (B). In FIG. 2, the write-in clock pulse train set C' for the first buffer memory 16 consists of three-phase write-in clock pulse trains illustrated along three next subsequent lines (C). Each of the three-phase clock pulse trains C' has a high level period substantially equal to the reference clock period. The write-in instants are defined by instants of build up of the three-phase clock pulse trains C'. The memorized digital signal train group D' memorized in the first buffer memory 16 and produced thereby is depicted along three next following lines (D). The read-out clock pulse train set G' consists of two read-out clock pulse trains illustrated along two next following lines (E). One of the trains G' has a high level period substantially equal to the local clock period. The other has a high level period substantially equal to twice the local clock period. The first read-out digital signal train $D''$ is illustrated along the bottom line (F). If the high and the low levels of the write-in and the read-out clock pulse trains are logic "1" and "0" levels, respectively, the read-out digital signal train sets, such as $D''$, are read out when the two read-out clock pulse trains G' cyclically define logic level combinations (0, 0), (0, 1), and (1, 1). It is possible to understand that the read-out instants are defined by beginnings of the logic level combination.

Figure 3:
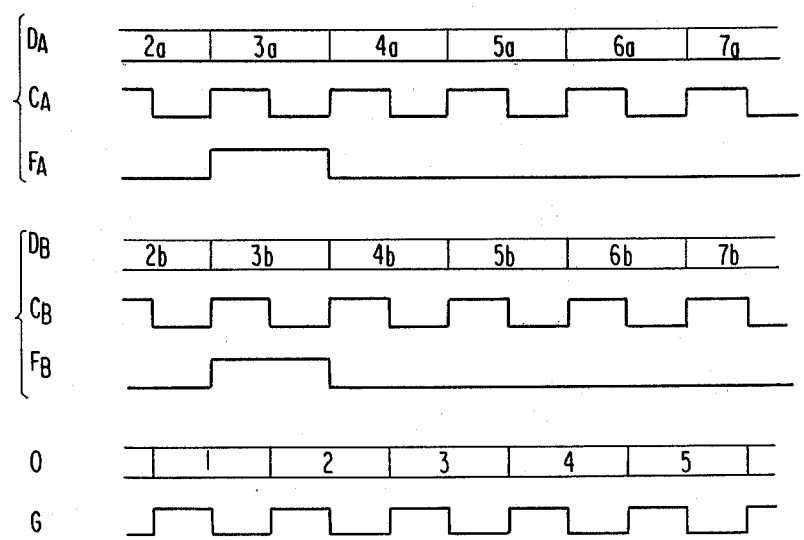
FIG. 3 is a time chart showing several signals that appear in the digital signal combining circuit according to the specific embodiment when two digital signal sequences supplied thereto have substantially no phase differnce therebetween.

In FIG. 3, the digital signal sequence $D_A$, the clock pulse sequence $C_A$, and the frame synchronizing signal sequence $F_A$ produced by the first receiver unit 11 and illustrated along three top lines, respectively, are in synchronism with the digital signal sequence $D_B$, the clock pulse sequence $C_B$, and the frame synchronizing signal sequence $F_B$ produced by the second receiver unit 12 and depicted along three next following lines, respectively. The digital signal sequence $D_B$ produced by the second receiver unit 12 comprises route digital signals 2b, 3b, . . . , and 7b that are identical with the route digital signals 2a, 3a, . . . , and 7a, respectively, unless the first and the second route signals A and B are differently subjected to fading. A second read-out digital signal train $D''_B$ read out of a second of the read-out circuits by the read-out clock pulse train set G' is inphase with the first read-out digital signal train $D''_A$. Any bit is neither lost nor duplicated as exemplified by the read-out digital signals 1, 2, . . . , and 5 of the receiver output signal O depicted along a next subsequent line irrespective of selection of whichever of the read-out digital signal trains $D''_A$ and $D''_B$. The digital signals in the receiver output signal O are in synchronism with the local clock pulse train G shown along the bottom line.

Figure 4:
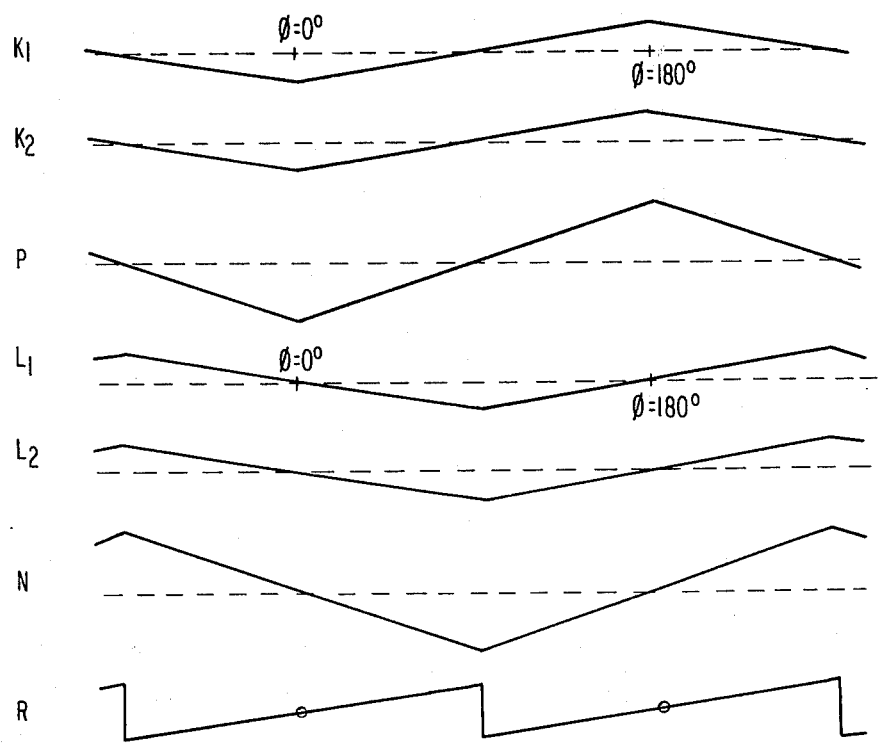
FIG. 4 shows several other signals that appear in the digital signal combining circuit in a case similar to the case for which the signals are depicted in FIG. 3.
Figure 5:
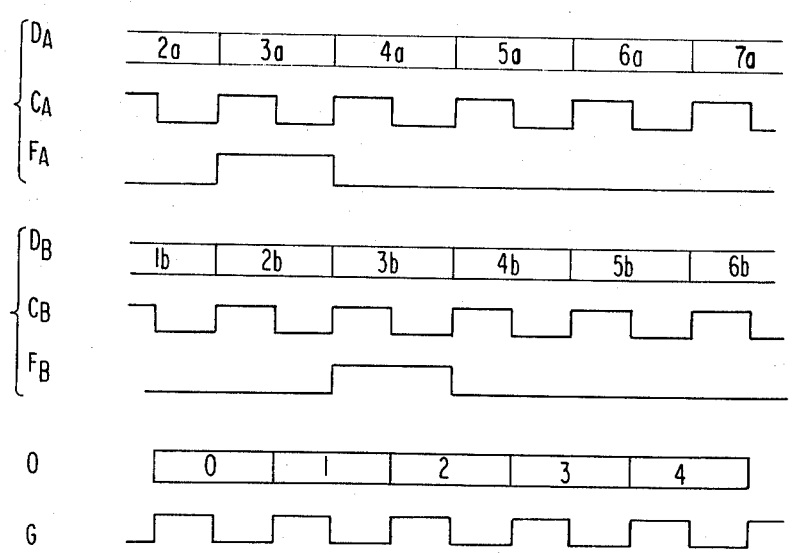
FIG. 5 is a time chart of the signals exemplified in FIG. 3 for a case in which the two digital signal sequences have a phase difference of one bit period therebetween.
Figure 6:
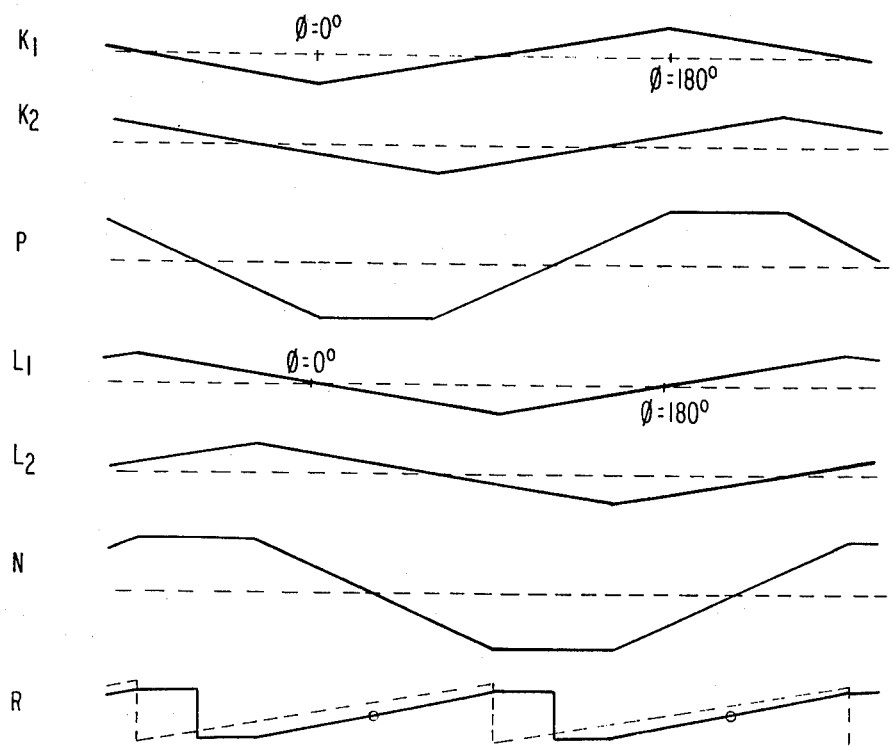

In FIGS. 4 through 6, let the phase of the clock pulse sequence $C_A$ produced by the first receiver unit 11 be considered merely for convenience of description to define a reference clock phase. The abscissae in FIGS. 4 and 6 represent a phase difference $\phi$ of the local clock pulse train G relative to the reference clock phase. An Exclusive OR circuit is used as the switching circuit 38.

In FIG. 4, the first-set phase difference signals $K_1$ and $K_2$ produced when the clock pulse sequence CB produced by the second receiver unit 12 is inphase with the reference clock phase, are variable with the phase difference $\phi$ as shown along two top lines, respectively, if those higher frequency components thereof are removed which appear when the local clock pulse train G is in an asynchronous state, namely, out of phase. The switching signal P varies as depicted along a next subsequent line. The second-set phase difference signals $L_1$ and $L_2$ vary as similarly illustrated along two next following lines, respectively. The second sum signal N varies as shown along a next succeeding line. The result signal R varies as exemplified along the bottom line. When the result signal R has a value indicated by small circles, the voltage controlled oscillator 21 stationarily produces the local clock pulse train G in synchronism with the inphase clock pulse sequences $C_A$ and $C_B$.

In FIG. 5, the reference clock phase at which the sequences $D_A$, $C_A$, and $F_A$ are produced by the first receiver unit 11 as illustrated along three top lines, lags by one bit period or interval, namely, one reference clock period, behind the common phase of the sequences $D_B$, $C_B$, and $F_B$ produced by the second receiver unit 12 and depicted along three next following lines. The read-out digital signal trains $D''_A$ and $D''_B$ are nevertheless in phase with each other because they are read out by the common read-out clock pulse train set G. The read-out digital signals 0, 1, . . . , and 4 in the receiver output signal O shown along a next subsequent line are synchronized with the respective local clock periods illustrated along the bottom line.

In FIG. 6, the first-set phase difference signals $K_1$ and $K_2$, the switching signal P, the second-set phase difference signals $L_1$ and $L_2$, and the second sum signal N shown along six upper lines are produced from the sequences $D_A$, $C_A$, and others illustrated in FIG. 5. Each of the signals varies with a period of six bit periods like the corresponding signal depicted in FIG. 4. The result signal R exemplified by a solid line along the bottom line varies with a phase difference of $\frac{1}{2}$ bit period relative to that illustrated in FIG. 4 and reproduced herein for reference by a dashed line. The voltage controlled oscillator 21 is phase locked so that the result signal R may have a value indicated again by small circles.

It is now understood that the result signal R has a phase difference of n/2 bit period(s) when the subsequent $D_B$, $C_B$, and $F_B$ either lead or lag behind the sequences $D_A$, $C_A$, and $F_A$ by n bit period(s). Thus, the read-out clock pulse trains G' are phase locked to an averaged phase of the digital signal sequences, such as $D_A$ and $D_B$. In other words, each read-out instant is automatically brought to an instant that corresponds to an averaged phase of the clock pulse sequences, such as $C_A$ and $C_B$. With this, it is possible to derive the receiver output signal O without any objectionable code error provided that the two route signals from which the read-out signal trains, such as $D''_A$ and $D''_B$, to be switched from one to the other in response to the selection signal S are derived, have a phase difference that is less than the reference clock period multiplied by the predetermined number.

In the digital signal combining circuit illustrated with reference to FIG. 1, a first clock synchronizing path comprising the first-set phase comparators, such as 31 and 32, the first voltage compounder 35, and the first low-pass filter 37, and a second clock synchronizing path comprising the 90° phase shifter 30, the second-set phase comparators, such as 33 and 34, and the second voltage compounder 36, and consequently the switching circuit 38, are for merely shortening the time required for restoring synchronization of the voltage controlled oscillator 21. It is therefore sufficient that a digital signal combining circuit according to another embodiment of the invention should comprise only one of the clock synchronizing paths with the switching circuit 38 omitted and with one of the low-pass filters 37 and 39 used when only the first clock synchronizing path is restored to. Alternatively, the 90°-phase pulse train $G_2$ may be supplied to the first-set phase comparators as named above, with the second clock synchronizing path, the switching circuit 38, and one of the low-pass filters 37 and 39 removed.

In connection with various embodiments of this invention and modifications thereof thus far described, either or each of the zero-phase and the 90°-phase pulse trains $G_1$ and $G_2$ may be called a passive pulse train. The passive pulse train $G_1$ or $G_2$ has a passive pulse period equal to twice the read-out clock period and a passive pulse phase dependent on the local clock phase. Similarly, either or each of the first and the second sum signals M and N may be referred to as a compounded signal. When tthe two clock synchronizing paths are used, it is convenient to understand that the switch output signal Q is supplied to the "second" low-pass filter 39 as a compounded signal, with the switching circuit 38 included in voltage compounding means together with the "first" low-pass filter 37.

While this invention has so far been described in conjunction with a few embodiments thereof and several modifications, it will now be readily possible to those skilled in the art to carry this invention into effect in various other ways. For instance, it is possible to produce each clock synchronizing pulse train by frequency multiplying the frame synchronizing signal sequence. The phase difference averaging circuit may therefore be connected to predetermined ones of the receiver units 11 and so forth and the write-in clock generators 17 and so on so that the phase difference averaging circuit is connected to a receiver unit in one of the channels and to a write-in clock generator in another. Likewise, it is possible to connect the phase difference averaging circuit directly to the voltage controlled oscillator 21 rather than through the read-out clock generator 22. As is the case with means for producing the clock synchronizing pulse trains, it is unnecessary that the write-in clock generators 17 and so forth be always frequency dividers. It is possible to understood that the delay circuit or circuits mentioned hereinabove are included in the receiver units 11 and so on.

What is claimed is:

1. A digital signal combining circuit for use in a digital diversity receiver for deriving a receiver output signal from a plurality of route signals received thereby, said diversity receiver comprising a plurality of receiver units for receiving the respective route signals and a selection signal producing circuit connected to said receiver units for producing a selection signal indicative of one of said route signals that is least subjected to fading of said route signals, each receiver unit deriving a clock pulse sequence of a reference clock period, a sequence of route digital signals variable at said reference clock period in compliance with the route signal received by said each receiver unit, and a frame synchronizing signal sequence of a frame period equal to an even integral multiple of said reference clock period from the last-mentioned route signal to produce said sequences, said combining circuit being for connection to said receiver units and said selection signal producing circuit and including;

a plurality of buffer memories connected to the respective receiver units, each buffer memory comprising a predetermined number of memory cells, said predetermined number being equal to an even integral submultiple of said integral multiple;

a plurality of write-in clock generators connected to the respective receiver units, each clock generator being for generating a set of write-in clock pulse trains of a write-in clock period equal to said reference clock period multiplied by said predetermined number and synchronized with the frame synchronizing signal sequence produced by the receiver unit connected to said each clock generator and of write-in clock phases staggered relative to each other to define a series of write-in instants, equal in number to said predetermined number, in every write-in clock period;

write-in means connected to each write-in clock generator, the receiver unit connected to said each write-in clock generator, and the memory cells of the buffer memory connected to the last-mentioned receiver unit for writing the digital signals of the digital signal sequences produced by the last-mentioned receiver unit cyclically in the last-mentioned memory cells at the respective write-in instants defined by the write-in clock pulse trains generated by said write-in clock generator, the last-mentioned memory cells thereby producing a plurality of those memorized digital signal trains, respectively, which comprise memorized digital signals variable at said write-in clock period and into which the last-mentioned digital signal sequence is divided with the route digital signals thereof converted to said memorized digital signals, respectively;

a plurality of read-out circuits connected to the respective buffer memories, each read-out circuit comprising a plurality of read-out units for receiving the memorized digital signal trains from the respective memory cells of the buffer memory connected to said each read-out circuit;

a voltage controlled oscillator for generating a local clock pulse train of a local clock period substantially equal to said reference clock period and of a controllable local clock phase; and a read-out clock generator connected to said voltage controlled oscillator for frequency dividing said local clock pulse train by said predetermined number to generate a set of read-out clock pulse trains of a read-out clock period and of read-out clock phases staggered relative to each other to define a series of read-out instants, equal in number to said predetermined number, in every read-out clock period;

wherein the improvement comprises:

phase difference averaging means connected to predetermined ones of said receiver units and said write-in clock generators for averaging the phase differences of the write-in clock pulse train sets generated by the respective write-in clock generators relative to said local clock phase to produce a result signal representative of an average of said phase difference;

control means connected to said phase difference averaging means and said voltage controlled oscillator for controlling said local clock phase in response to said result signal;

read-out means connected to each read-out circuit and said read-out clock generator for reading a train of read-out digital signals cyclically from the read-out units of said each read-out circuit, said read-out digital signals being those portions of the memorized digital signals received by the last-mentioned read-out units, respectively, which are specified by said read-out instants; and selecting means connected to said selection signal producing circuit, said voltage controlled oscillator, and the read-out means connected to the respective read-out circuits for deriving said receiver output signal by selecting, with reference to said selection signal and said local clock pulse train, one of the read-out digital signal trains read out of the respective read-out circuits.

2. A digital signal combining circuit as claimed in claim 1, wherein said phase difference averaging means comprises:

a plurality of clock synchronizing pulse producing means, equal in number to said receiver units, each clock synchronizing pulse producing means being connected to a predetermined one of the receiver unit and the write-in clock generator connected to the last-mentioned receiver unit for producing a clock synchronizing pulse train of a clock synchronizing period equal to twice said write-in clock period and of a clock synchronizing phase synchronized with the frame synchronizing signal sequence produced by the last-mentioned receiver unit;

passive pulse producing means connected to a predetermined one of said voltage controlled oscillator and said read-out clock generator for producing a passive pulse train of a passive pulse period equal to twice said read-out clock period and of a passive pulse phase dependent on said local clock phase;

phase comparing means connected to said plurality of clock synchronizing pulse producing means and said passive pulse producing means for comparing the clock synchronizing phases of the clock synchronizing pulse trains produced by the respective clock synchronizing pulse producing means with said passive pulse phase to produce a plurality of phase difference signals of levels representative of the respective results of comparison;

voltage compounding means connected to said phase comparing means for summing the levels of said phase difference signals to produce a compounded signal of a level equal to a sum of the phase difference signal levels; and low-pass filter means connected to said voltage compounding means for rejecting higher frequency components of said compounded signal to produce said result signal.

3. A digital signal combining circuit as claimed in claim 2, wherein:

said phase comparing means comprises:

a 90° phase shifter connected to said passive pulse producing means for shifting the phase of said passive pulse train by 90° to produce a 90°-phase pulse train;

first-set phase comparing means connected to said plurality of clock synchronizing pulse producing means and said passive pulse producing means for comparing said clock synchronizing phases with said passive pulse phase to produce a plurality of first-set phase difference signals of levels representative of the respective results of comparison carried out thereby; and second-set phase comparing means connected to said plurality of clock synchronizing pulse producing means and said 90° phase shifter for comparing said clock synchronizing phases with the phase of said 90°-phase pulse train to produce a plurality of second-set phase difference signals of levels representative of the respective results of comparison carried out thereby;

said voltage compounding means comprising:

a first voltage compounder connected to said first-set phase comparing means for summing the levels of said first-set phase difference signals to produce a first sum signal of a level equal to a sum of the first-set phase difference signal levels;

a low-pass filter connected to said first voltage compounder for rejecting higher frequency components of said first sum signal to produce a switching signal;

a second voltage compounder connected to said second-set phase comparing means for summing the levels of said second-set phase difference signals to produce a second sum signal of a level equal to a sum of the second-set phase difference signals;

switching means connected to said low-pass filter and said second voltage compounder for switching said second sum signal in response to said switching signal to produce a switch output signal; and means connected to said switching means for producing said switch output signal as said compounded signal.

* * * * *

UNITED STATES PATENT AND TRADEMARK OFFICE
CERTIFICATE OF CORRECTION

PATENT NO. : 4,270,210

DATED : May 26, 1981

INVENTOR(S) : Tan et al.

It is certified that error appears in the above—identified patent and that said Letters Patent is hereby corrected as shown below:

Column 1, line 62, delete "switches" and insert -- switched -- .

Column 2, line 10, delete "signal" and insert -- system -- ;

line 17, delete "sequence" and insert -- sequences -- .

Column 4, line 45, delete "differnce" and insert -- difference --

Column 5, line 34, delete "accomplished" and insert -- accompanied -- .

Column 7, line 36, delete "facing" and insert -- fading -- .

Column 9, line 2, delete " $D''_A$, " and insert -- $D''$, -- .

Column 10, lines 57-58, delete "subsequent" and insert -- sequences -- ;

line 68, after "read-out" insert -- digital -- .

UNITED STATES PATENT AND TRADEMARK OFFICE
CERTIFICATE OF CORRECTION

PATENT NO. : 4,270,210
DATED : May 26, 1981
INVENTOR(S) : Tan et al.

It is certified that error appears in the above—identified patent and that said Letters Patent is hereby corrected as shown below:

Column 11, lines 60-61, delete "understood" and insert -- understand -- .

Column 12, line 37, delete "sequences" and insert -- sequence -- ;

line 41, after "said" insert -- each -- .

Column 13, line 9, delete "difference" and insert -- differences -- .

Signed and Sealed this

Eighth Day of September 1981

[SEAL]

Attest:

Attesting Officer

GERALD J. MOSSINGHOFF

Commissioner of Patents and Trademarks